(12) United States Patent
Cho et al.

(10) Patent No.: US 11,340,332 B2
(45) Date of Patent: May 24, 2022

(54) METHOD AND APPARATUS FOR PROCESSING RADAR DATA

(71) Applicant: SAMSUNG ELECTRONICS CO., LTD., Suwon-si (KR)

(72) Inventors: Hyun Woong Cho, Seoul (KR); Dong Han Kim, Osan-si (KR); Sung Do Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 494 days.

(21) Appl. No.: 16/390,552

(22) Filed: Apr. 22, 2019

(65) Prior Publication Data

US 2020/0174096 A1    Jun. 4, 2020

(30) Foreign Application Priority Data

Dec. 4, 2018  (KR) .................. 10-2018-0154686

(51) Int. Cl.
*G01S 7/35* (2006.01)
*G01S 13/58* (2006.01)
*G01S 13/931* (2020.01)

(52) U.S. Cl.
CPC ............ *G01S 7/354* (2013.01); *G01S 13/583* (2013.01); *G01S 13/931* (2013.01)

(58) Field of Classification Search
CPC ...... G01S 7/292; G01S 7/2922; G01S 7/2927; G01S 7/354; G01S 13/524; G01S 13/583; G01S 13/931
See application file for complete search history.

(56) References Cited

U.S. PATENT DOCUMENTS

| | | | | |
|---|---|---|---|---|
| 6,046,695 A * | 4/2000 | Poehler | ............... | G01S 13/9019 342/25 A |
| 6,072,424 A | 6/2000 | Cremona et al. | | |
| 6,275,180 B1 * | 8/2001 | Dean | ..................... | G01S 13/931 342/70 |
| 6,833,808 B2 * | 12/2004 | Rees | ..................... | G01S 13/534 342/159 |
| 9,110,152 B2 * | 8/2015 | Ando | ..................... | G01S 7/4056 |
| 9,529,082 B1 * | 12/2016 | Rikoski | ............... | G01S 7/52004 |

(Continued)

FOREIGN PATENT DOCUMENTS

| | | |
|---|---|---|
| CN | 107728146 A | 2/2018 |
| EP | 0 879 425 A1 | 11/1998 |

(Continued)

OTHER PUBLICATIONS

Extended European Search Report dated Apr. 23, 2020 in corresponding European Patent Application No. 19204823.9 (9 pages in English).

(Continued)

*Primary Examiner* — Peter M Bythrow
(74) *Attorney, Agent, or Firm* — NSIP Law

(57) ABSTRACT

A radar data processing method and apparatus. The radar data processing apparatus calculates phase information of a radar signal received by a radar sensor, calculates noise representative information from the calculated phase information, and determines driving-related information based on the noise representative information and radar data calculated from the radar signal.

23 Claims, 15 Drawing Sheets

(56) References Cited

U.S. PATENT DOCUMENTS

| | | | |
|---|---|---|---|
| 9,746,546 B2* | 8/2017 | Lee | G01S 13/584 |
| 10,205,457 B1* | 2/2019 | Josefsberg | H03L 7/091 |
| 2004/0174294 A1 | 9/2004 | Arnold et al. | |
| 2007/0285315 A1* | 12/2007 | Davis | H01Q 3/2629 |
| | | | 342/377 |
| 2008/0100500 A1* | 5/2008 | Kondoh | G01S 13/34 |
| | | | 342/109 |
| 2008/0122678 A1 | 5/2008 | Rivas et al. | |
| 2015/0070207 A1* | 3/2015 | Millar | G01S 13/4454 |
| | | | 342/174 |
| 2015/0323649 A1* | 11/2015 | Lee | G01S 13/04 |
| | | | 342/27 |
| 2015/0338505 A1* | 11/2015 | Oshima | G01S 7/28 |
| | | | 342/107 |
| 2015/0338513 A1 | 11/2015 | Moon et al. | |
| 2016/0084941 A1* | 3/2016 | Arage | G01S 13/584 |
| | | | 342/91 |
| 2016/0146925 A1* | 5/2016 | Millar | G01S 13/44 |
| | | | 342/113 |
| 2016/0209504 A1* | 7/2016 | Stein | G01S 3/44 |
| 2016/0238694 A1* | 8/2016 | Kishigami | G01S 7/292 |
| 2017/0170560 A1* | 6/2017 | Ookawa | G01S 13/93 |
| 2017/0269196 A1* | 9/2017 | Millar | G01S 7/4026 |
| 2017/0302282 A1* | 10/2017 | Josefsberg | H03L 7/091 |
| 2017/0343646 A1* | 11/2017 | Bechter | G01S 13/931 |
| 2018/0024235 A1* | 1/2018 | Hong | G01S 13/87 |
| | | | 342/59 |
| 2019/0128998 A1* | 5/2019 | Josefsberg | H03L 7/091 |
| 2019/0129026 A1* | 5/2019 | Sumi | G01S 15/8997 |
| 2019/0146059 A1* | 5/2019 | Zanati | G01S 7/4052 |
| | | | 342/173 |
| 2019/0235066 A1* | 8/2019 | Iida | G01S 7/352 |
| 2019/0242972 A1* | 8/2019 | Melzer | G01S 13/12 |
| 2020/0200863 A1* | 6/2020 | Booij | G01S 5/18 |
| 2020/0393536 A1* | 12/2020 | Stettiner | G01S 7/0235 |
| 2021/0080540 A1* | 3/2021 | Vossiek | G01S 7/354 |

FOREIGN PATENT DOCUMENTS

| | | |
|---|---|---|
| EP | 3 064 960 A1 | 9/2016 |
| JP | 2016-3975 A | 1/2016 |
| JP | 2018-72014 A | 5/2018 |
| KR | 10-1295756 B1 | 8/2013 |
| KR | 10-2015-0018839 A | 2/2015 |

OTHER PUBLICATIONS

Kellner, D., et al., "Instantaneous Ego-Motion Estimation using Doppler Radar", *IEEE*, Oct. 2013, pp. 869-874 (6 pages in English).

Rapp, M., et al., "A Fast Probabilistic Ego-Motion Estimation Framework for Radar", *IEEE*, 2015, pp. 1-6 (6 pages in English).

* cited by examiner

METHOD AND APPARATUS FOR PROCESSING RADAR DATA

CROSS-REFERENCE TO RELATED APPLICATION

This application claims the benefit under 35 USC § 119(a) of Korean Patent Application No. 10-2018-0154686, filed on Dec. 4, 2018, in the Korean Intellectual Property Office, the entire disclosure of which is incorporated herein by reference for all purposes.

BACKGROUND

1. Field

The following description relates to a technology of processing radar data.

2. Description of Related Art

Advanced driver-assistance systems (ADAS) are assistance systems to enhance safety and convenience of a driver and to support driving for the purpose of avoiding a dangerous situation, using sensors installed inside and/or outside a vehicle.

Sensors used in an ADAS may include, for example, a camera, an infrared sensor, an ultrasonic sensor, a light detection and ranging (lidar) and a radar. Among these sensors, the radar may stably measure an object in a vicinity of a vehicle regardless of a surrounding environment such as weather, in comparison to an optical-based sensor.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of processing radar data includes calculating phase information of a radar signal received by a radar sensor, calculating noise representative information from the calculated phase information, and determining driving-related information based on the noise representative information and radar data calculated from the radar signal.

The calculating of the phase information may include sensing a series of chirp signals through a scan of the radar sensor for each target point, and calculating a phase change tendency corresponding to the sensed series of chirp signals.

The calculating of the phase change tendency may include determining Doppler axis-based phase values from each chirp signal of the sensed series of chirp signals.

The calculating of the phase change tendency may include identifying each of a plurality of target points based on distance information and angle information analyzed from the radar signal.

The calculating of the phase information may include applying an unwrapping operation to the phase information.

The calculating of the noise representative information may include estimating a linear model based on a linear regression analysis of the phase information, and estimating a goodness of fit of the phase information with respect to the linear model as the noise representative information.

The calculating of the noise representative information may include calculating an error between a phase value and a value estimated based on the linear model for each chirp signal of a series of chirp signals, and determining a sum associated with the calculated error as the noise representative information.

The determining of the driving-related information may include detecting a neighboring object based on the noise representative information and a result obtained by processing the radar data.

The determining of the driving-related information may include determining a target point indicating a normal signal in the noise representative information based on a comparison between the noise representative information and a threshold, and determining the driving-related information based on radar data and noise representative information corresponding to the determined target point.

The method may further include determining the threshold based on a distribution of the noise representative information.

The determining of the threshold may include determining, as the threshold, a value between a value corresponding to a first peak and a value corresponding to a second peak in the distribution.

The determining of the driving-related information may include estimating a candidate velocity from radar data corresponding to each of a plurality of target points indicating the normal signal, and determining a vehicle velocity based on candidate velocities estimated from the plurality of target points.

The determining of the vehicle velocity may include estimating the candidate velocity based on an angle and a Doppler velocity calculated from the normal signal reflected from each of the plurality of target points and received.

The determining of the vehicle velocity may include determining, as the vehicle velocity, a representative value representing a plurality of candidate velocities.

The method may further include providing the driving-related information to a user.

The providing of the driving-related information may include visualizing a vehicle velocity calculated from the driving-related information.

The method may further include indicating, as the driving-related information, object detection information detected based on the radar data and the noise representative information.

The indicating of the object detection information may include controlling a movement of a vehicle based on the object detection information.

In another general aspect, an apparatus for processing radar data includes a radar sensor configured to sense a radar signal, and a processor configured to calculate phase information of the radar signal, to calculate noise representative information from the calculated phase information, and to determine driving-related information based on the noise representative information and radar data calculated from the radar signal.

In another general aspect, an apparatus includes a radar sensor to sense radar signals related to a plurality of target points, and a processor to calculate noise representative information associated with the radar signals, classify a distribution of the noise representative information into a first distribution having a first peak and a second distribution having a second peak, determine, as a threshold, a value between a noise representative value corresponding to the first peak and a noise representative value corresponding to the second peak, and classify the radar signals sensed from the plurality of target points based on the threshold and generate a signal map including target points with a normal signal from the noise representative information.

The processor may determine that a normal signal is received from a specific target point in a case in which a noise representative value of a radar signal sensed from the specific target point is less than the threshold.

The processor may determine that a noise signal is received from a specific target point when a noise representative value of a radar signal sensed from the specific target point is greater than or equal to the threshold Other features and aspects will be apparent from the following detailed description, the drawings, and the claims.

Figure 1:
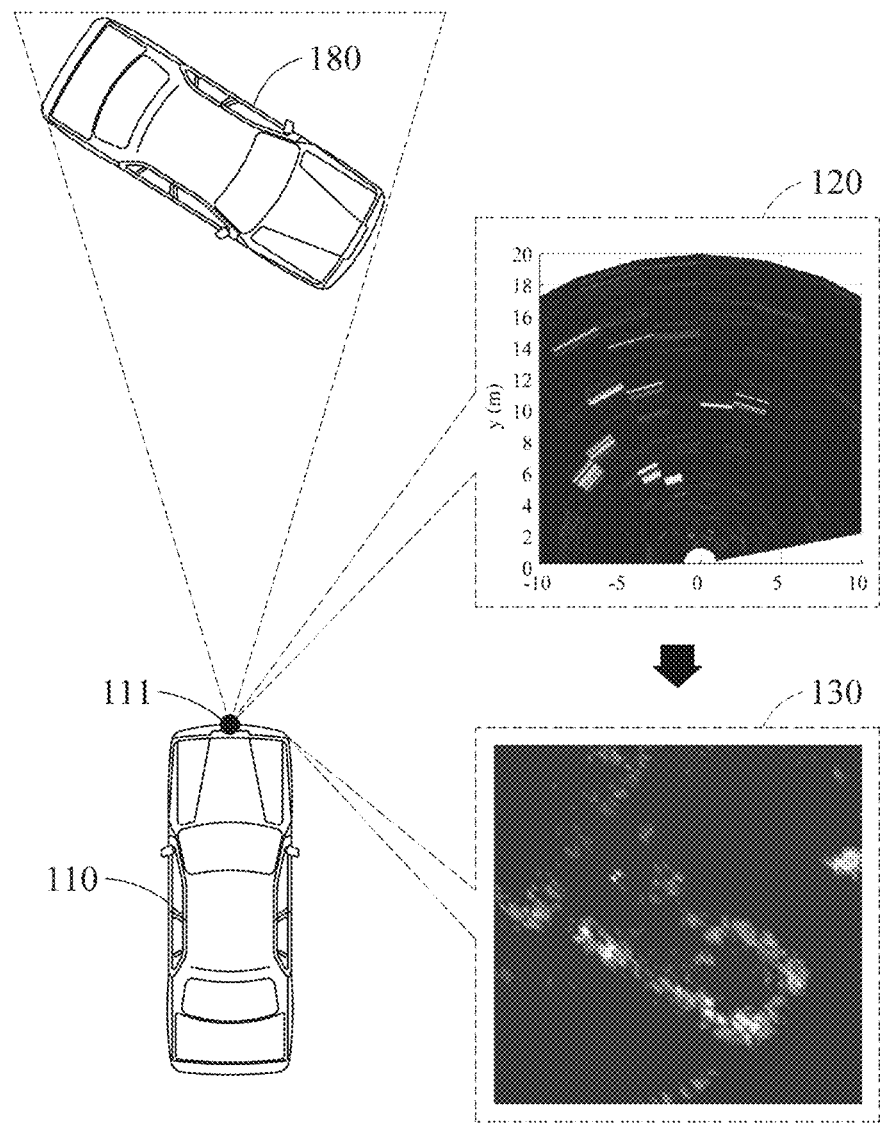
FIG. 1 illustrates an example of a recognition of a surrounding environment using a radar data processing method.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The following structural or functional descriptions are examples to merely describe the examples, and the scope of the examples is not limited to the descriptions provided in the present specification.

Various modifications may be made to the following examples. Here, the examples are not construed as limited to the disclosure and should be understood to include all changes, equivalents, and replacements within the idea and the technical scope of the disclosure.

The terminology used herein is for the purpose of describing particular examples only and is not to be limiting of the examples. As used herein, the singular forms are intended to include the plural forms as well, unless the context clearly indicates otherwise. It should be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood. Terms defined in dictionaries generally used should be construed to have meanings matching with contextual meanings in the related art and are not to be construed as an ideal or excessively formal meaning unless otherwise defined herein.

Hereinafter, examples will be described in detail with reference to the accompanying drawings, and like reference numerals in the drawings refer to like elements throughout.

FIG. 1 illustrates an example of a recognition of a surrounding environment using a radar data processing method.

An apparatus 110 for processing radar data (hereinafter, referred to as a "radar data processing apparatus 110") detects an object 180 located in front of a vehicle using a sensor. For example, a sensor to detect an object includes an image sensor or a radar sensor, and is configured to detect a distance to the object 180. In the following description, a radar sensor is used as a sensor. The radar sensor may detect radar signals reflected from the object 180 and the other obstacles, as well as the object 180. For example, a radar signal emitted from the radar sensor is reflected from an arbitrary point, and the reflected signal may be sensed by the radar sensor. In this example, the point reflecting the radar signal is referred to as a "target point."

In FIG. 1, a sensor is a radar. The radar data processing apparatus 110 analyzes a radar signal received by a radar sensor 111 and detects a distance to the object 180, an azimuth angle, an elevation angle, and a radial velocity. The radar sensor 111 may be located inside or outside the radar data processing apparatus 110. Also, the radar data processing apparatus 110 detects the distance to the object 180 based on data collected by other sensors (for example, an image sensor) as well as the radar signal received from the radar sensor 111.

The radar data processing apparatus 110 is installed in a vehicle. The vehicle performs, for example, an adaptive cruise control (ACC) operation, an autonomous emergency braking (AEB) operation, and a blind spot detection (BSD) operation based on a distance to an object detected by the radar data processing apparatus 110.

Also, the radar data processing apparatus 110 generates a surrounding map 130, in addition to detecting a distance. The surrounding map 130 is a map that shows locations of targets present in the vicinity of the radar data processing apparatus 110. For example, a target around the radar data processing apparatus 110 may be a dynamic object, such as, a vehicle or a person, or a static object (for example, a background), such as a guardrail or a traffic light. A target point is an arbitrary point on the target, and is not necessarily limited to a location on the target. The target point is, for example, a point that reflects an arbitrary radar signal sensed with regularity.

To generate the surrounding map 130, a single scan image method is used. The single scan image method is a method of acquiring a single scan image 120 from a sensor and generating the surrounding map 130 from the acquired scan image 120 using the radar data processing apparatus 110. The single scan image 120 is a radar scan image, and represents distances indicated by radar signals received by the radar sensor 111. For example, in the single scan image 120 of FIG. 1, a horizontal axis represents an azimuth angle of the radar sensor 111 and a vertical axis represents a distance from the radar sensor 111 to a target. The azimuth angle is an angle defined based on an optical axis of the radar sensor or a longitudinal axis of a vehicle on a plane parallel to a base of the vehicle.

However, a form of the single scan image 120 is not limited to that of FIG. 1, and the single scan image 120 may be expressed in a different format depending on a design. For example, a scan image may be represented by an axis corresponding to an elevation angle in addition to an axis corresponding to an azimuth angle and an axis corresponding to a distance to a target. In this example, when the elevation angle is included, radar data is represented as four-dimensional (4D) data. The elevation angle is an angle defined based on the optical axis of the radar sensor or a longitudinal axis of the vehicle on a plane perpendicular to the base of the vehicle.

The radar data processing apparatus 110 acquires accurate information about a shape of a target based on a multi-radar map. The multi-radar map is generated from a combination of a plurality of radar scan images. For example, the radar data processing apparatus 110 generates the surrounding map 130 by spatially and temporally combining radar scan images acquired by a movement of the radar sensor 111.

Radar data includes raw data sensed by the radar sensor 111.

To generate the surrounding map 130, direction-of-arrival (DOA) information is utilized. The DOA information is information indicating a direction in which a radar signal reflected from a target point is received. The DOA information is used to generate radar scan data and a surrounding map.

The radar data processing apparatus 110 receives the same amount of information as a number of virtual antennas of the radar sensor and acquires raw radar data. Also, the radar data processing apparatus 110 acquires high-resolution DOA information based on a type of algorithms (for example, a multiple signal classification (MUSIC) algorithm, or estimation of signal parameters via rotational invariance technique (ESPRIT)) of a DOA estimation operation to interpret raw radar data.

Hereinafter, an example of using additional data based on a phase of a radar signal as well as a strength of the radar signal in processing of radar data will be described.

Figure 2:
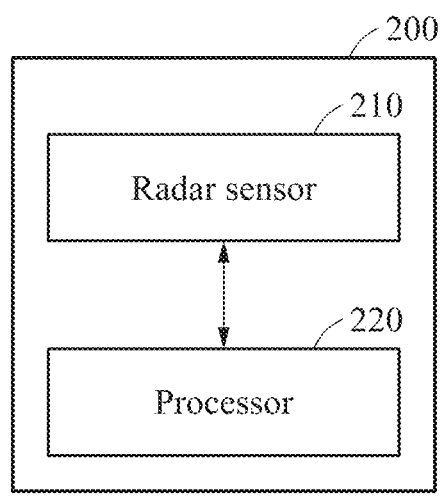
FIG. 2 illustrates an example of a configuration of a radar data processing apparatus.

FIG. 2 illustrates an example of a configuration of a radar data processing apparatus 200.

Referring to FIG. 2, the radar data processing apparatus 200 includes a radar sensor 210 and a processor 220.

The radar sensor 210 senses radar data. For example, the radar sensor 210 externally radiates a radar signal and receives a signal corresponding to the radiated radar signal reflected from a target point. For example, the radar sensor 210 radiates a series of chirp signals corresponding to a single scan and receives signals corresponding to the radiated chirp signals. An example of the radar sensor 210 will be further described below with reference to FIG. 4.

The processor 220 calculates phase information of a radar signal. The phase information includes a phase value corresponding to each of a series of chirp signals included in a sensed radar signal. The phase information will be described below with reference to FIGS. 5 through 7. The processor 220 calculates noise representative information from the calculated phase information. The noise representative information is information associated with an amount of noise included in the phase information. The noise representative information will be described below with reference to FIG. 12. The processor 220 determines driving-related information based on the noise representative information and radar data calculated from the radar signal. The driving-related information includes, for example, object detection information, and information associated with a state (for example, a vehicle velocity) of a driving vehicle.

The radar sensor 210 and the processor 220 are implemented as separate modules, however, examples are not limited thereto. The radar sensor 210 and the processor 220 may be integrated.

Figure 3:
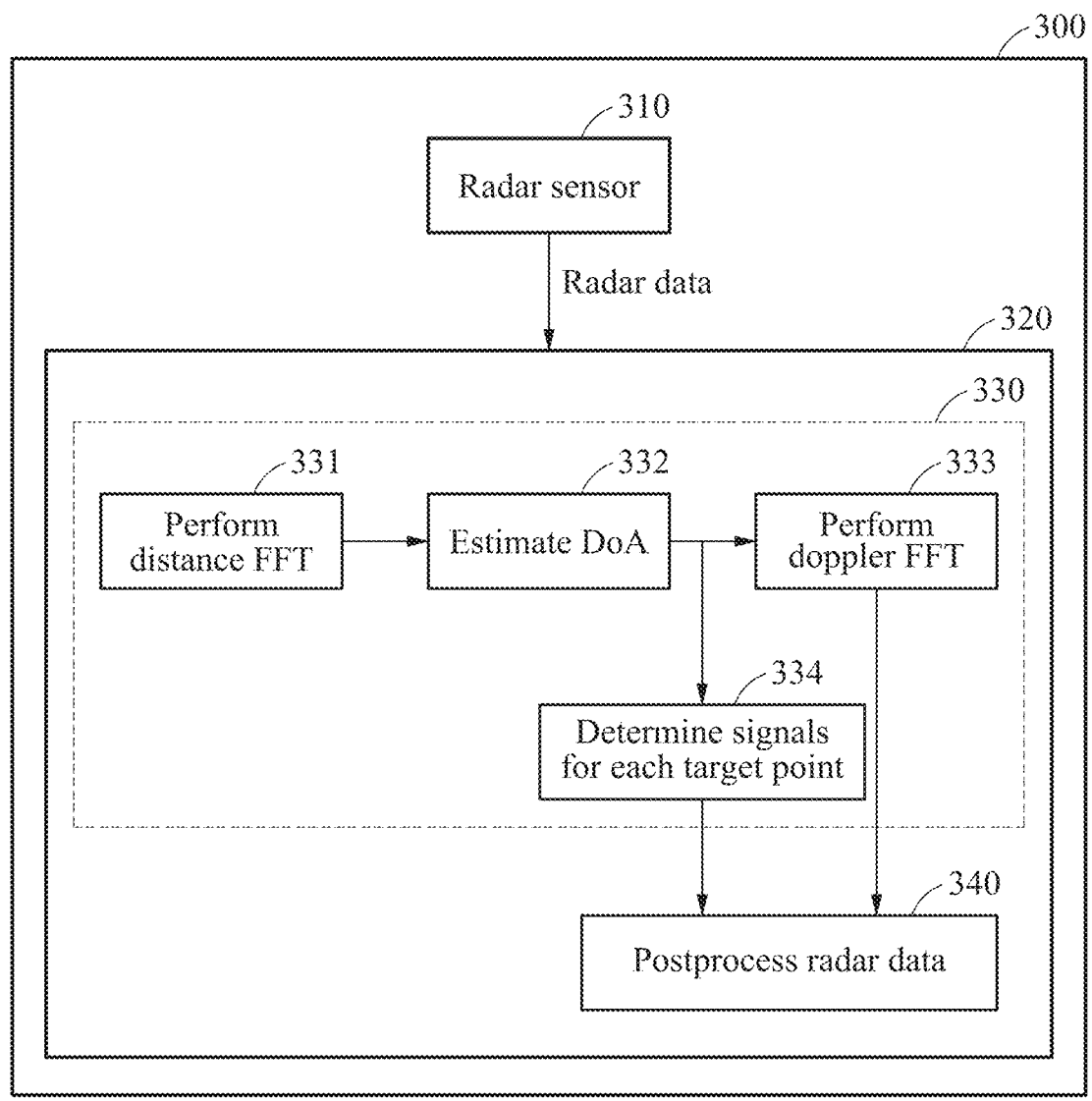
FIG. 3 illustrates an example of an internal operation of a radar data processing apparatus.

FIG. 3 illustrates an example of an internal operation of a radar data processing apparatus 300.

The radar data processing apparatus 300 acquires radar data using a radar sensor 310 as described above.

A processor 320 performs operation 330 of preprocessing radar data and operation 340 of postprocessing radar data. For example, operation 330 includes operation 331 of performing a distance fast Fourier transform (FFT), operation 332 of estimating a DOA, operation 333 of performing a Doppler FFT, and operation 334 of determining signals for each target point. Operation 340 includes an operation of determining driving-related information based on preprocessed data.

Radar data is three-dimensional (3D) data, and axes respectively correspond to a time used until an arbitrary electromagnetic wave is transmitted and received by the radar sensor 310, a change between chirp signals transmitted during one scan, and a change in chirp signals received between virtual antennas.

Operation 330 includes an operation of converting each of the axes of the radar data to a distance axis, a radial velocity axis and an angle axis. A radial velocity is a relative velocity of a target point when a radar sensor faces a target point. For example, the processor 320 processes the radar data in an order of operations 331, 333 and 332. However, since information corresponding to each of the axes of the radar data includes separable information, the same result is obtained even though an FFT operation and a digital beamforming (DBF) operation are applied by changing a processing order. The angle axis is an axis associated with an azimuth angle. Although the azimuth angle is mainly described in the present disclosure, examples are not limited. The angle axis is, for example, an axis associated with both the azimuth angle and an elevation angle.

For example, in operation 331, the processor 320 converts the time used until the electromagnetic wave is transmitted and received in the radar data to a distance value by applying an FFT operation to the time.

In operation 332, the processor 320 estimates an angle corresponding to a DOA of a radar signal reflected from a target point using a scheme, such as a DBF.

Since two axes (for example, a distance axis and an angle axis) of the radar data are defined as described above, the radar data processing apparatus 300 identifies target points using the two axes. The radar data processing apparatus 300 tracks a signal change between chirp signals based on the other axes (for example, a Doppler axis) for each of the target points identified by the distance axis and angle axis.

For example, when operations 331 and 332 are performed, the processor 320 performs operation 334. Through operation 334, the processor 320 generates information (for example, noise representative information) distinguished from a Doppler value. In operation 334, the processor 320 tracks a phase change tendency based on a Doppler axis of a radar signal from the radar data, and estimates noise representative information based on the phase change tendency. The noise representative information is information about an amount of noise included in a radar signal reflected from a target point and received as described above, and includes a value indicating whether a probability of a corresponding radar signal being a normal signal is high or whether a probability of a corresponding radar signal being a noise signal is high. Thus, the noise representative information indicates a reliability of a radar signal sensed from a target point, or a ratio of noise included in a corresponding radar signal. The noise representative information includes a noise representative value as a value obtained by binarizing a residual sum of squares (RSS) value for each target point. However, examples are not limited thereto.

In operation 333, the radar data processing apparatus 300 estimates a radial velocity (for example, a Doppler velocity) from a signal change between chirp signals based on the Doppler axis. The processor 320 applies, as operation 333, an FFT operation to a signal change between chirp signals at an arbitrary distance and an arbitrary angle, to acquire a radial velocity at the distance and the angle.

The processor 320 acquires a strength (for example, data representing a return power) sensed with respect to a distance, an angle and a radial velocity from a result of operations 331, 332 and 333, and applies operation 340 to corresponding data.

The radar data processing apparatus 300 uses two types of data as an input for operation 340. Radar data among the two types of data is, for example, 3D data that represents a strength at which a radar signal reflected from a target point at an arbitrary distance, an arbitrary angle and an arbitrary radial velocity is sensed. Noise representative information as the other data is, for example, two-dimensional (2D) data (for example, a goodness of fit of phase information with respect to a linear model that will be described below with reference to FIG. 12) that represents a noise representative value associated with an amount of noise included in a radar signal reflected from a target point at an arbitrary distance and an arbitrary angle. The processor 320 performs an object detection, an object tracking, an object identification, an estimation of a velocity of a vehicle itself, and radar imaging, as operation 340 based on data preprocessed as described above.

The radar data processing apparatus 300 more accurately calculates driving-related information based on noise representative information associated with a phase of a radar signal together with radar data associated with a strength of the radar signal. The driving-related information includes, for example, an object detection result, an object tracking result, an object identification result, a vehicle velocity, and a radar image. Thus, the radar data processing apparatus 300 also detects an object (for example, a bicycle or a pedestrian) with a relatively low radar cross-section (RCS) based on the noise representative information.

Figure 4:
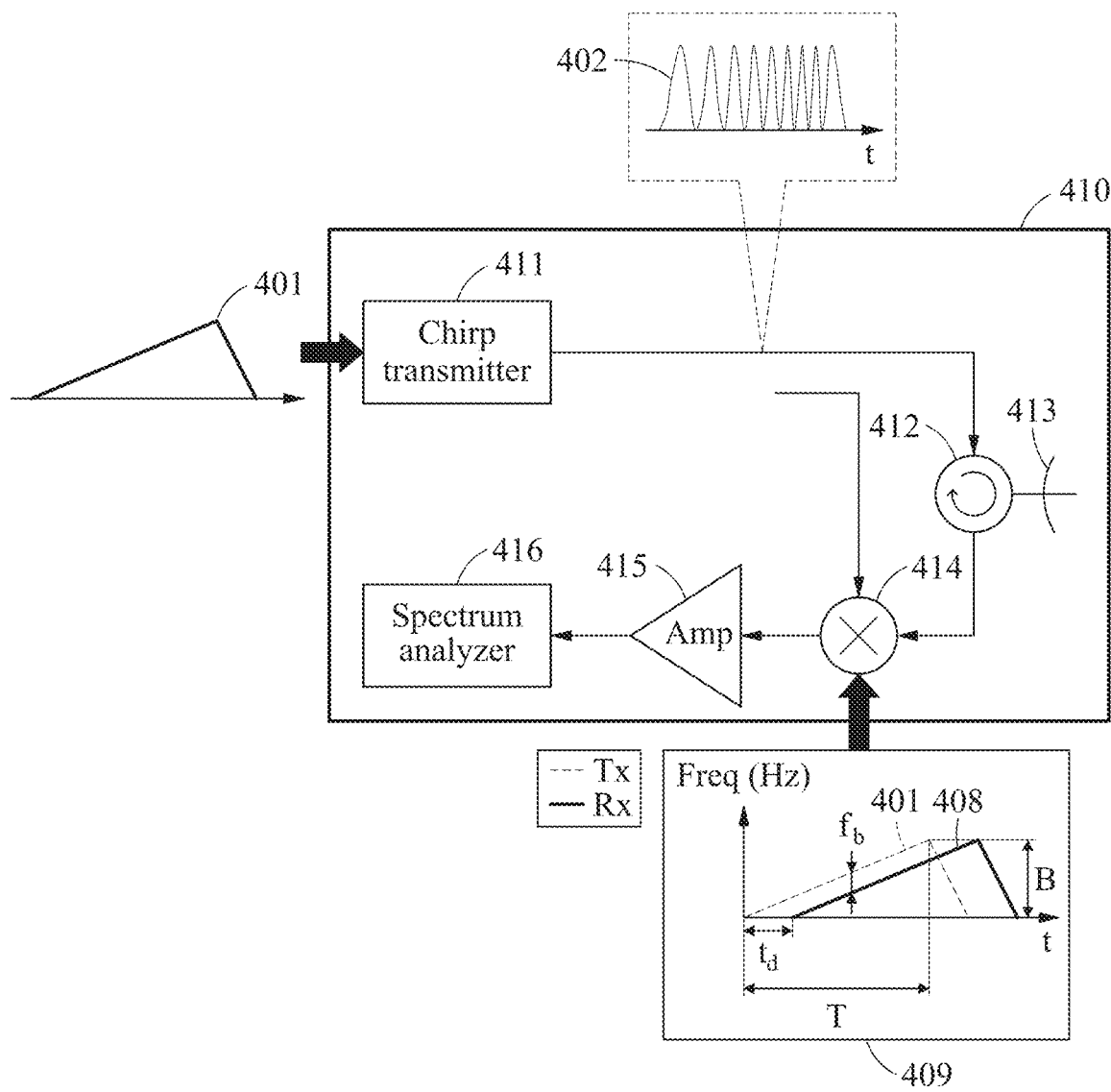
FIG. 4 illustrates an example of a configuration of a radar sensor.

FIG. 4 illustrates an example of a configuration of a radar sensor 410.

The radar sensor 410 radiates a signal through an antenna 413 and receives a signal through the antenna 413. The radar sensor 410 is, for example, a millimeter wave (mmWave) radar, and is configured to measure a distance to an object by analyzing a change in a signal waveform and a time of flight (TOF) that a radiated electric wave returns after hitting an object. The radar sensor 410 is implemented as, for example, a frequency-modulated continuous-wave radio detection and ranging (FMCW radar).

A chirp transmitter 411 of the radar sensor 410 generates a frequency modulated (FM) signal 402 with a frequency changing over time. For example, the chirp transmitter 411 generates the FM signal 402 by modulating a frequency of a chirp signal 401. The chirp signal 401 is a signal having a frequency linearly increasing or decreasing over time. In the chirp signal 401 of FIG. 4, a horizontal axis and a vertical axis represent a time and frequency, respectively. For example, the chirp transmitter 411 generates the FM signal 402 having a frequency that is based on the chirp signal 401. For example, as shown in FIG. 4, the FM signal 402 has a waveform of a gradually increasing frequency in an interval in which the frequency of the chirp signal 401 increases, and has a waveform of a gradually decreasing frequency in an interval in which the frequency of the chirp signal 401 decreases. The chirp transmitter 411 transfers the FM signal 402 to a duplexer 412 of the radar sensor 410.

The duplexer 412 determines a transmission path and a reception path of a signal through the antenna 413. For example, while the radar sensor 410 is radiating the FM signal 402, the duplexer 412 forms a signal path from the chirp transmitter 411 to the antenna 413, transfers the FM signal 402 to the antenna 413 through the formed signal path, and externally radiates the FM signal 402.

When the radar sensor 410 currently receives a signal reflected from an object, the duplexer 412 forms a signal path from the antenna 413 to a spectrum analyzer 416. The antenna 413 receives a signal that is reflected and returned after a radiated signal arrives at an obstacle, and the radar sensor 410 transfers the reflected signal through the signal path from the antenna 413 to the spectrum analyzer 416.

A frequency mixer 414 demodulates the received signal to a linear signal (for example, an original chirp signal) of which a frequency is not modulated. An amplifier 415 amplifies an amplitude of the linear signal.

The spectrum analyzer 416 compares the radiated chirp signal 401 to a signal 408 that is reflected from an object and that is returned. The spectrum analyzer 416 detects a frequency difference between the radiated chirp signal 401 and the reflected signal 408. The frequency difference between the radiated chirp signal 401 and the reflected signal 408 indicates a constant difference during an interval in which a frequency of the radiated chirp signal 401 linearly increases based on a time axis in a graph 409 of FIG. 4, and is proportional to a distance between the radar sensor 410 and the object. Thus, the distance between the radar sensor 410 and the object is derived from the frequency difference between the radiated chirp signal 401 and the reflected signal 408. The spectrum analyzer 416 transmits analyzed information to a processor of a radar data processing apparatus.

For example, the spectrum analyzer 416 calculates the distance between the radar sensor 410 and the object using Equation 1 shown below.

$$R = \frac{cTf_b}{2B} \quad \text{Equation 1}$$

In Equation 1, R denotes the distance between the radar sensor 410 and the object, and c denotes a velocity of light. Also, T denotes a duration of an interval in which the radiated chirp signal 401 increases. $f_b$ denotes the frequency difference between the radiated chirp signal 401 and the reflected signal 408 at an arbitrary point in time within an increase interval, and is referred to as a "beat frequency." B denotes a modulated bandwidth. For example, the beat frequency fb is derived using Equation 2 shown below.

$$f_b = \frac{t_d B}{T} \quad \text{Equation 2}$$

In Equation 2, $f_b$ denotes the beat frequency, and $t_d$ denotes a time difference (for example, a delay time) between a point in time at which the chirp signal 401 is radiated and a point in time at which the reflected signal 408 is received.

For example, a plurality of radar sensors is installed in various portions of a vehicle, and the radar data processing apparatus calculates relative velocities, directions, and distances to target points with respect to all directions of the vehicle, based on information sensed by the plurality of radar sensors. The radar data processing apparatus is installed in the vehicle. The vehicle provides various functions, for example, an ACC, a BSD, and a lane change assistance (LCA), which are helpful for driving, based on information obtained based on information collected by the radar sensors.

Each of the plurality of radar sensors modulates a frequency of a chirp signal, externally radiates the chirp signal, and receives a signal reflected from a target point. Although estimating a distance based on a chirp signal sensed by the radar sensor has been described above with reference to FIG. 4, examples are not limited thereto. Thus, a variety of information may be acquired as described above with reference to FIG. 3.

An example of transmitting and receiving a series of chirp signals during one scan is described below with reference to FIG. 5.

Figure 5:
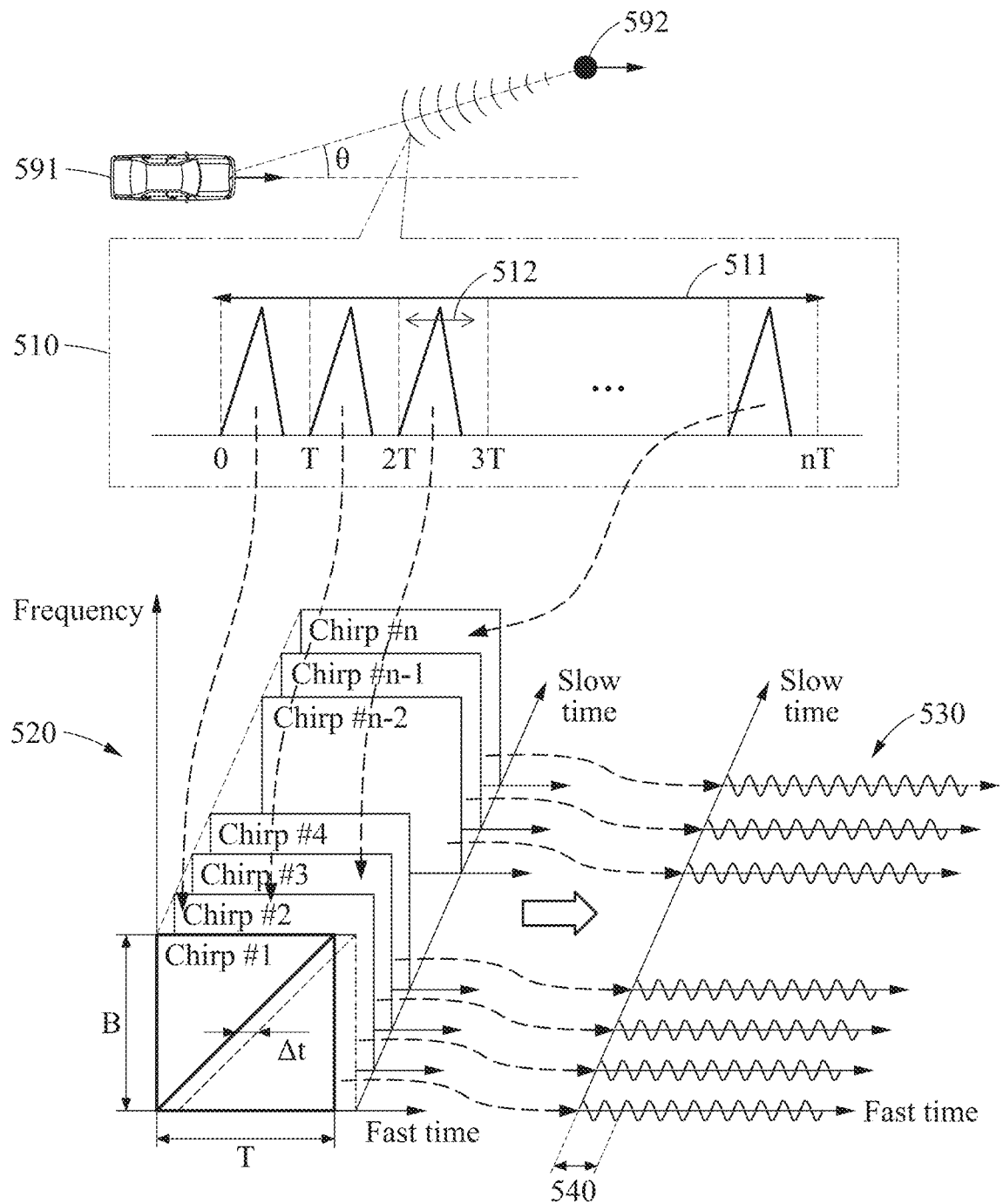
FIG. 5 illustrates an example of chirp signals acquired by a scan of a radar sensor.

FIG. 5 illustrates an example of chirp signals acquired by a scan of a radar sensor.

In FIG. 5, a radar data processing apparatus is a vehicle 591, and senses a radar signal 510 reflected from a target point 592. The radar signal 510 corresponding to one scan 511 includes a plurality of chirp signals. For example, each of chirp signals 512 has a period of T, and the radar signal 510 corresponding to one scan includes "n" chirp signals. A radar sensor radiates "n" chirp signals during one scan and senses the "n" chirp signals. A time length of the radar signal 510 corresponding to the scan 511 is nT. In this example, n is an integer greater than or equal to 1. Each of chirp signals is emitted in ms, and thus a velocity of targets is assumed as a constant during emission of the chirp signals.

The chirp signals included in the radar signal 510 are represented by a graph 520 that shows a fast time axis, a slow time axis and a frequency axis, as shown in FIG. 5. The slow time axis is a time axis separated by chirp signals, and the fast time axis is a time axis that shows a frequency change of each of the chirp signals 512. When each of the chirp signals 512 is expressed as a waveform 530 of a beat signal, a phase 540 changes for each of the chirp signals 512 as shown in FIG. 5.

The radar data processing apparatus uses a result obtained by sensing the above change in the phase 540 to calculate driving-related information. A phase change tendency of chirp signals included in a radar signal varies based on a target point and a movement of a vehicle, which will be described below with reference to FIGS. 6 and 7.

Figure 6:
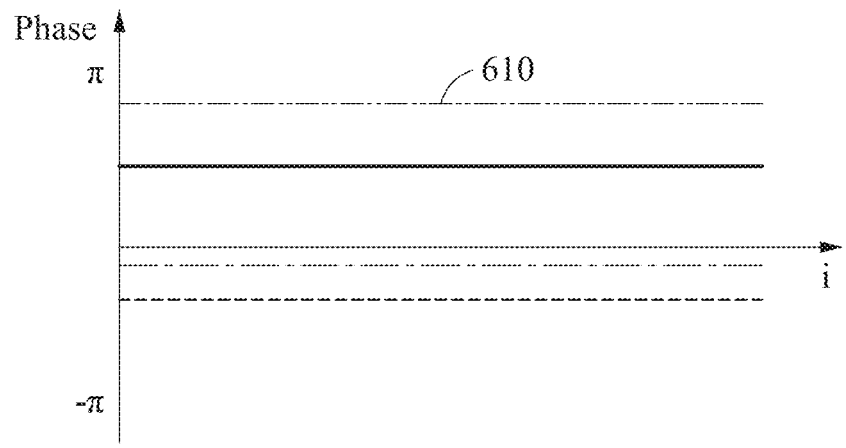
FIGS. 6 and 7 illustrate examples of a phase change of a sensed radar signal.
Figure 7:
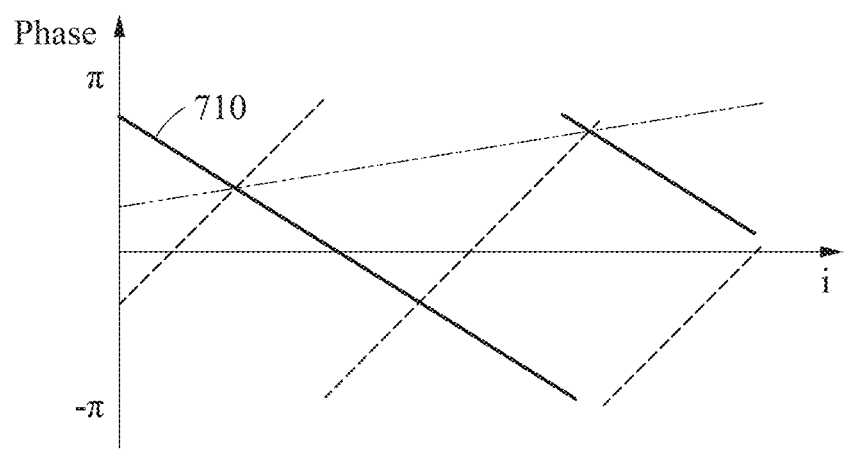

FIGS. 6 and 7 illustrate examples of a phase change of a sensed radar signal.

A radar signal sensed by a radar sensor is modeled as shown in Equation 3 below.

$$s(r,i,\theta) \propto \exp(j(a \cdot i + b + \varepsilon(i))) \quad (3)$$

In Equation 3, s(r, i, θ) denotes a radar signal reflected from a target point located at an angle of θ and a distance r from the radar sensor. a and b denote arbitrary constants, and i denotes an index indicating an i-th chirp signal among "n" chirp signals included in a radar signal corresponding to an arbitrary scan. i is an integer greater than or equal to 1 and less than or equal to n. ε(i) denotes a noise component included in the i-th chirp signal. j(a·i+b+ε(i)) corresponds to a phase of the i-th chirp signal. For example, when noise is absent, a phase of a radar signal has a linearity based on an index of a chirp signal.

In an example, FIG. 6 illustrates a phase change tendency 610 of a radar signal sensed in a state in which both a vehicle and a target point are static. In the state in which both the vehicle and the target point are static, a phase remains unchanged as shown in the phase change tendency 610.

In another example, FIG. 7 illustrates a phase change tendency 710 of a radar signal sensed in a state in which at least one of a vehicle and a target point moves. In the state of FIG. 7, a phase linearly increases or decreases based on an index (for example, i) of a chirp signal as shown in the phase change tendency 710. Each of three lines represents a phase change based on an index i of a chirp signal with respect to a radar signal sensed from a point that is located at an arbitrary distance from a radar sensor and at an arbitrary angle based on the radar sensor. An increase in the index i indicates lapse of time based on a slow time axis.

When noise is absent, phase values respectively corresponding to chirp signals included in a radar signal corresponding to one scan linearly change based on an index of each of the chirp signals (for example, the slow time axis of FIG. 5).

Figure 8:
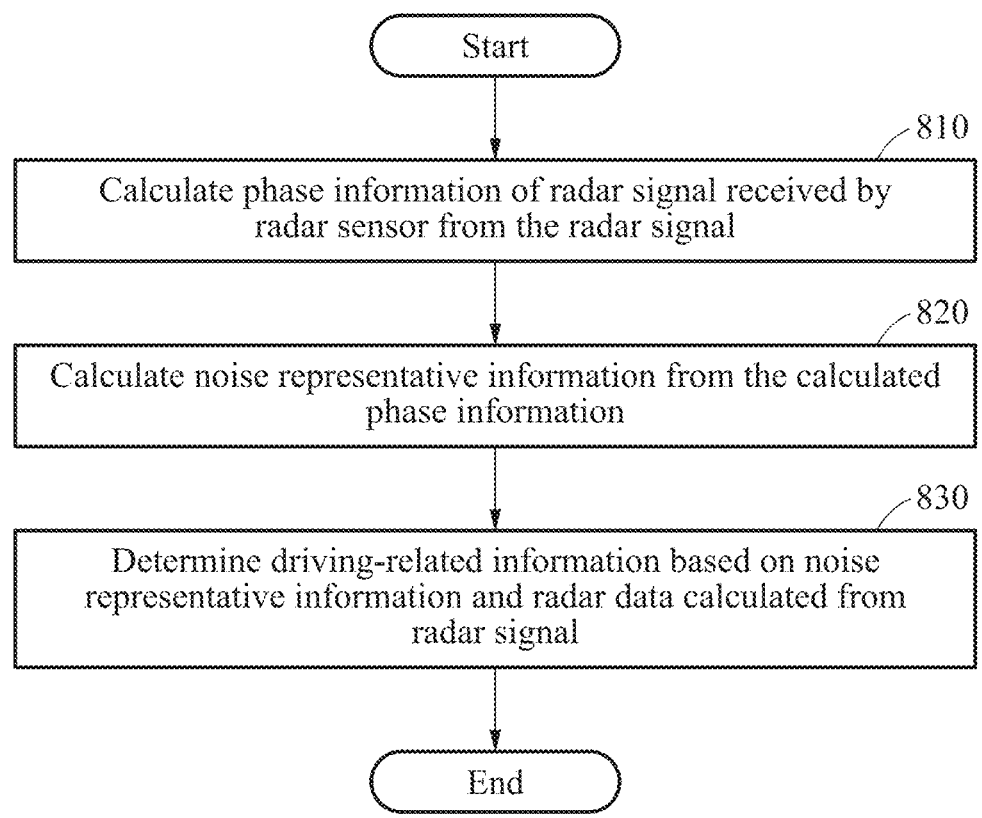
FIG. 8 is a flowchart illustrating an example of a radar data processing method.

FIG. 8 is a flowchart illustrating an example of a method of processing radar data.

Referring to FIG. 8, in operation 810, a radar data processing apparatus calculates phase information of a radar signal received by a radar sensor from the radar signal. For example, the radar sensor senses a series of chirp signals through a scan for each individual target point. A processor calculates a phase change tendency corresponding to the sensed series of chirp signals. The processor determines Doppler axis-based phase values as phase information from each of the sensed series of chirp signals.

In operation 820, the radar data processing apparatus calculates noise representative information from the calculated phase information. The processor estimates a linear model based on a linear regression analysis of the phase information. The processor estimates a goodness of fit of the phase information with respect to the linear model, as noise representative information. An example of estimating a goodness of fit of phase information will be described below with reference to FIG. 12.

In operation 830, the radar data processing apparatus determines driving-related information based on the noise representative information and radar data calculated from the radar signal. For example, the processor determines the driving-related information based on a result obtained by binarizing the noise representative information.

Figure 9:
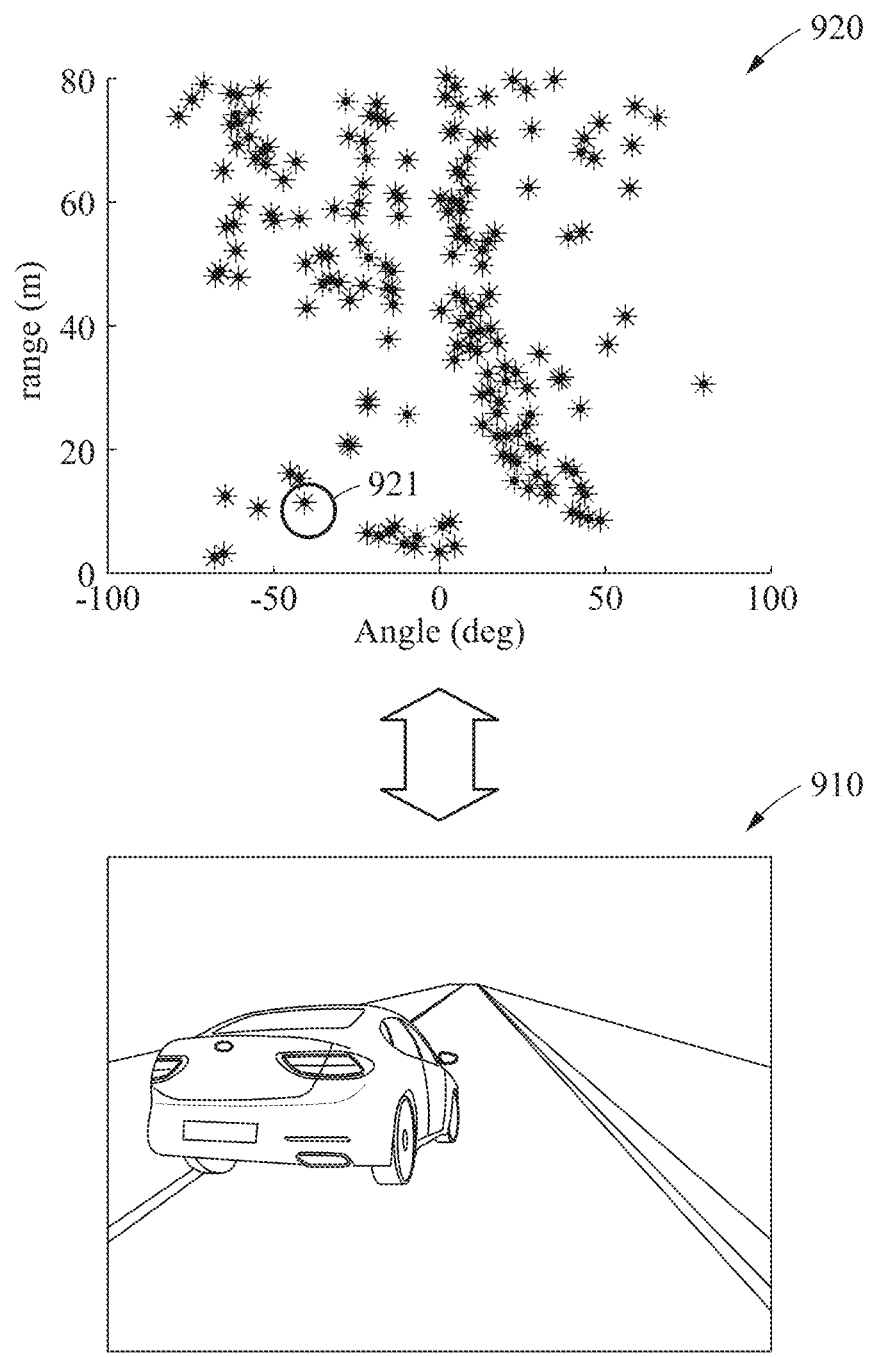
FIG. 9 illustrates an example of identified target points.

FIG. 9 illustrates an example of identified target points.

FIG. 9 illustrates an environment 910 in which a preceding object (for example, a preceding vehicle) is in front of an apparatus (for example, a vehicle) including a radar data processing apparatus.

The radar data processing apparatus generates a surrounding map 920 based on a result obtained by analyzing a radar signal based on a distance axis and an angle axis. The surrounding map 920 of FIG. 9 is a map indicating target points identified from the radar signal for each distance and each angle. For example, the radar data processing apparatus identifies each of a plurality of target points based on angle information and distance information analyzed from the radar signal. The angle information is information about the angle axis, and the distance information is information about the distance axis. The radar data processing apparatus tracks a phase change over time for each chirp signal included in a radar signal corresponding to one scan at each of the identified target points.

Hereinafter, an example of a phase change of a radar signal reflected from a target point 921 among the plurality of target points identified in the surrounding map 920 is described with reference to FIG. 10.

Figure 10:
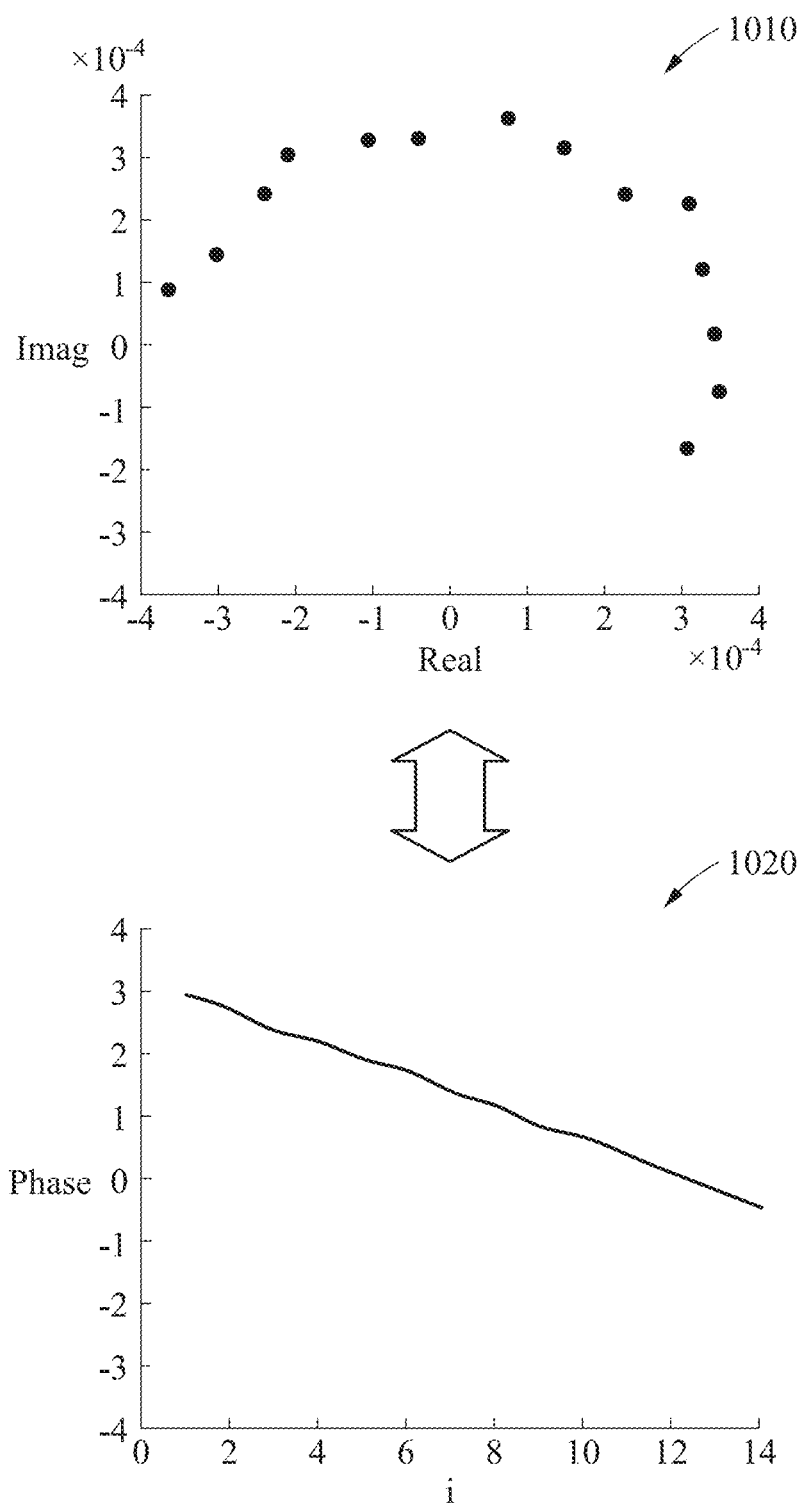
FIG. 10 illustrates an example of a phase change of a radar signal reflected from an identified target point.

FIG. 10 illustrates an example of a phase change of a radar signal reflected from an identified target point.

FIG. 10 illustrates a phase change tendency for the target point 921 that is adjacent to a radar sensor of the radar data processing apparatus of FIG. 9. A phase change tendency for one target point is represented by a graph 1010 that is based on a real axis and an imaginary axis, and a graph 1020 that is based on a chirp signal index axis and a phase axis. As shown in the graph 1020, a phase value calculated for the target point 921 linearly decreases. For example, a change in a phase value may not show a perfect linearity as shown in FIG. 10 due to a noise component, for example, ε(i).

Figure 11:
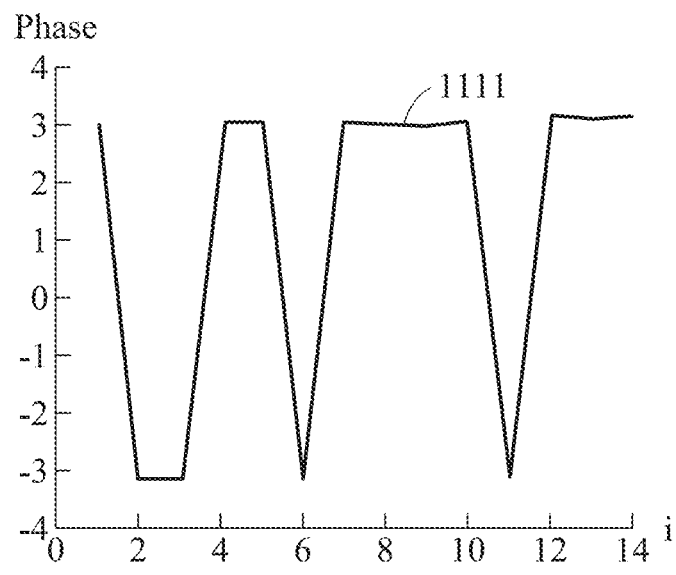
FIG. 11 illustrates an example of an operation of applying an unwrapping operation to phase information of a radar signal.
Figure 11:
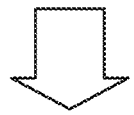
Figure 11:
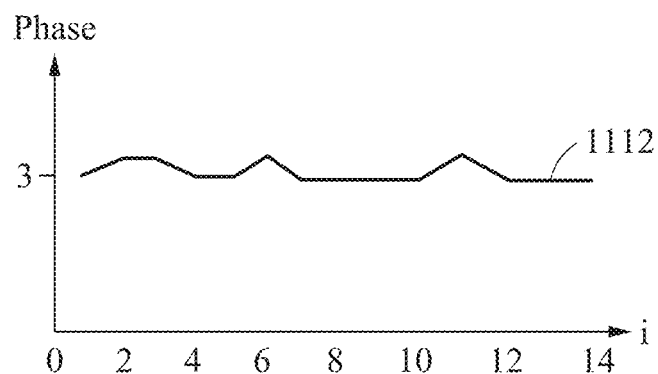

FIG. 11 illustrates an example of an operation of applying an unwrapping operation to phase information of a radar signal.

FIG. 11 illustrates a wrapping phenomenon that may occur in phase information. A phase value is in a range of π to −π due to a periodicity, and thus a phase slightly greater than π is represented as a value slightly greater than −π and a phase slightly less than −π is represented as a value slightly less than π. Thus, when a value is shaken from π or −π, a phase value rapidly changes, which is referred to as a "wrapping phenomenon." In phase information 1 1 1 1 including the wrapping phenomenon, a phase value rapidly changes for each chirp signal index i, as shown in FIG. 11.

For example, referring back to FIG. 7, a solid line indicates that the wrapping phenomenon occurs once, a dashed line indicates that the wrapping phenomenon occurs twice, and a dashed-double-dot line indicates that the wrapping phenomenon does not occur.

The wrapping phenomenon occurs when continuous phase information is sampled in a format of a discrete wrapped phase. A format of a wrapped phase corresponds to a scheme of representing a phase as an interval of (−π, π] or (0,2π]. For example, when an absolute phase is represented in a format of a wrapped phase, an ambiguity problem occurs. In this example, an operation of restoring the absolute phase to solve the ambiguity problem is referred to as a "unwrapping operation."

A radar data processing apparatus applies the unwrapping operation to phase information. In phase information 1112 from which the wrapping phenomenon is eliminated by the unwrapping operation, a range of fluctuation in data is reduced as shown in FIG. 11. The radar data processing apparatus calculates noise representative information from the phase information 1112 to which the unwrapping operation is applied, which will be described below with reference to FIG. 12.

Figure 12:
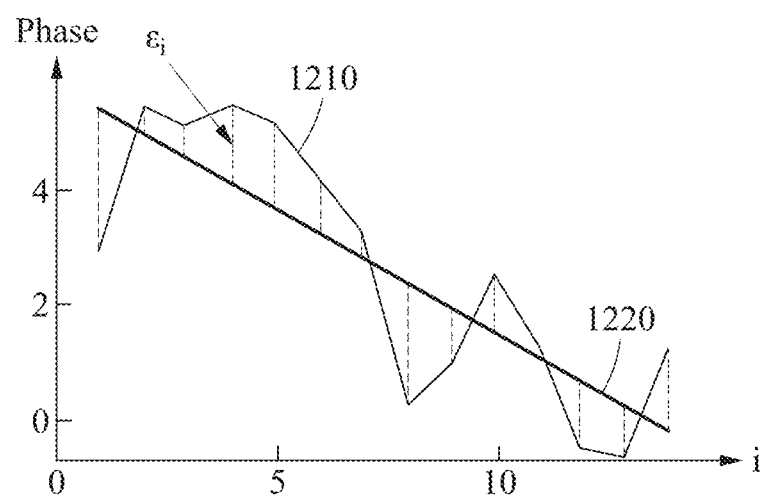
FIG. 12 illustrates an example of an operation of calculating noise representative information from phase information.

FIG. 12 illustrates an example of an operation of calculating noise representative information from phase information.

A radar data processing apparatus estimates a linear model 1220 based on a linear regression analysis of phase information 1210. The linear model 1220 is, for example, a linear function approximated by the calculated phase information 1210. The radar data processing apparatus determines the linear model 1220 matching the phase information 1210 using a known linear regression analysis technique.

The radar data processing apparatus estimates a goodness of fit of the phase information 1210 with respect to the linear model 1220, as noise representative information. The radar data processing apparatus calculates an error between a phase value and a value estimated based on the linear model 1220, for each of a series of chirp signals. The radar data processing apparatus determines a sum associated with the calculated error as noise representative information. For example, the radar data processing apparatus calculates noise representative information for an arbitrary target point identified by a distance and an angle during one scan, as an RSS value shown in Equation 4 below.

$$RSS = \sum_{i=1}^{n} (\varepsilon_i)^2 = \sum_{i=1}^{n} (y_i - (\alpha + \beta x_i))^2 \qquad \text{Equation 4}$$

In Equation 4, $y_i$ denotes a phase value corresponding to an i-th chirp signal, and $x_i$ denotes an index of the i-th chirp signal and represents i. α and β denote coefficients of the linear model 1220. $\varepsilon_i$ denotes an error between the i-th chirp signal and the linear model 1220. In an example, when the RSS value increases, an amount of noise included in a radar signal sensed from a corresponding target point increases. In another example, when the RSS value decreases, the amount of noise included in the radar signal sensed from the corresponding target point decreases. However, the noise representative information is not limited thereto, and an R square value (for example, a coefficient of determination) based on Equations 5 through 7 may be used.

$$SS_{tot} = \sum_{i} (y_i - \bar{y})^2 \qquad \text{Equation 5}$$

$$SS_{res} = \sum_i (y_i - f_i)^2 = \sum_i e_i^2 \qquad \text{Equation 6}$$

$$R^2 \equiv 1 - \frac{SS_{res}}{SS_{tot}} \qquad \text{Equation 7}$$

In Equations 5, 6, and 7, $y_i$ denotes a phase value corresponding to an i-th chirp signal, $\bar{y}$ denotes an average of phase values corresponding to chirp signals included in a radar signal, and $f_i$ denotes a value corresponding to the i-th chirp signal based on the linear model 1220. $SS_{tot}$ denotes a total sum of squares, $SS_{res}$ denotes a regression sum of squares, and $R^2$ denotes a coefficient of determination.

Although the RSS value and the coefficient of determination have been described above as a sum associated with an error, examples are not limited thereto. The sum associated with the error is a sum of absolute values of the error.

Figure 13:
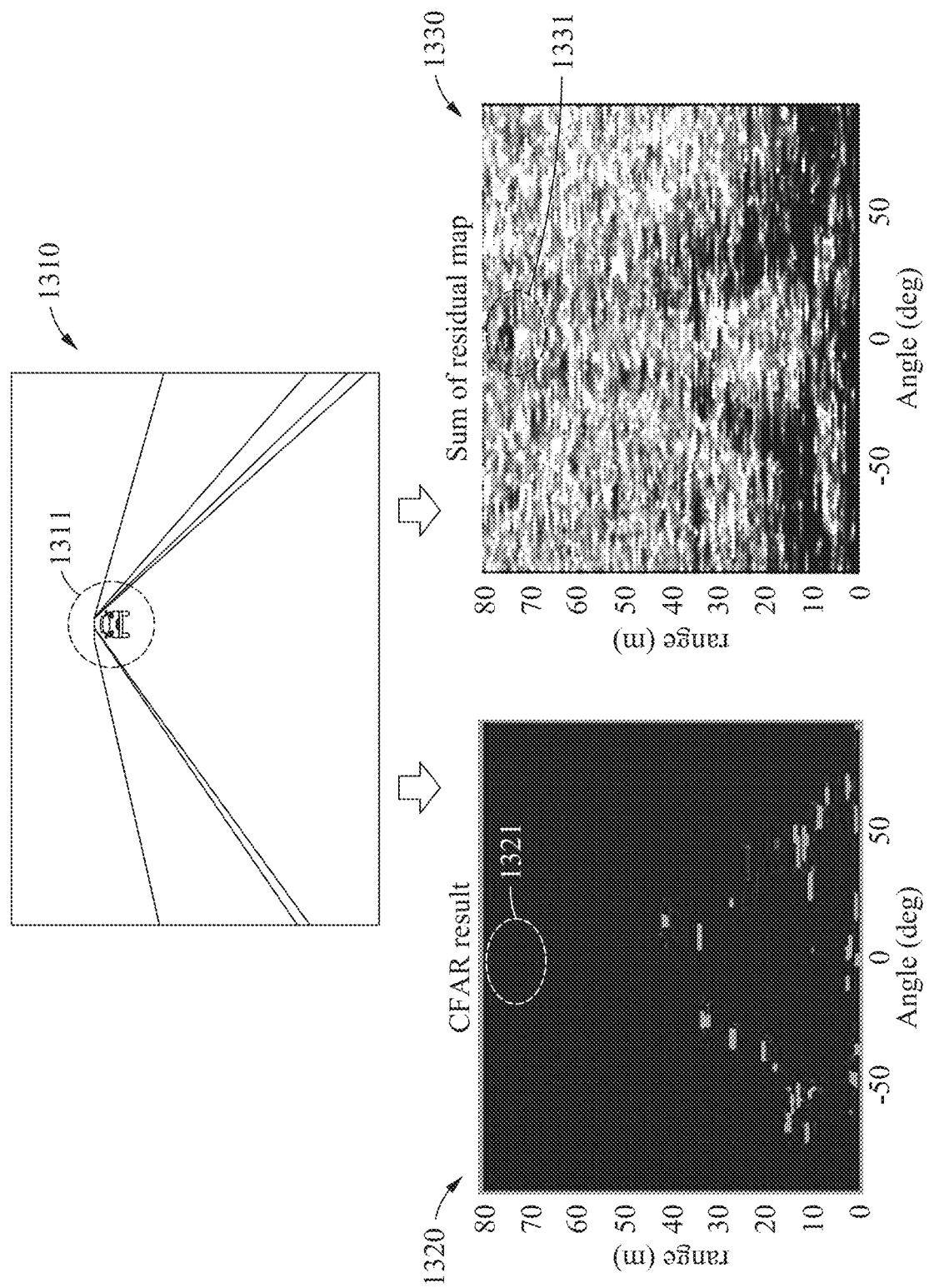
FIG. 13 illustrates an example of utilization of noise representative information.

FIG. 13 illustrates an example of utilization of noise representative information.

FIG. 13 illustrates an example of a scene captured by a radar sensor. FIG. 13 illustrates a situation 1310 in which a preceding object 1311 (for example, a preceding vehicle) is in front of an apparatus (for example, a vehicle) including a radar data processing apparatus. For example, a radar sensor is installed on one side (for example, a front side) of a vehicle, and a field of view (FOV) of the radar sensor is directed to a front direction of the vehicle.

A radar data processing apparatus calculates radar data and noise representative information 1330 from a radar signal sensed by the radar sensor, as described above with reference to FIG. 3.

The radar data processing apparatus calculates a target detection result that is based on a signal strength, as radar data from a radar signal. For example, the radar data processing apparatus calculates a detection result based on a constant false alarm rate (CFAR) scheme. The detection result based on the CFAR scheme is referred to as a "CFAR result 1320." In the CFAR result 1320, a target point is identified by a distance axis and an angle axis. The CFAR scheme is used to determine a probability that a point (for example, a cell under test (CUT)) is a target based on a neighboring cell, and is, for example, a thresholding scheme based on a strength of a signal sensed for the point by the radar sensor and a threshold determined based on a signal strength (for example, a noise floor) of the neighboring cell. In an example, when the strength of the signal sensed from the point is greater than the threshold determined based on a strength of a signal sensed from the neighboring cell, the radar data processing apparatus determines the point as a target point. In another example, when the strength of the signal sensed from the point is less than or equal to the threshold, the radar data processing apparatus determines the point as a non-target point. As described above, the target point is an arbitrary point on a target, for example, a human or a vehicle.

However, a detection result based on a strength of a radar signal may not capture a target with a weak signal strength. For example, when a target is small in size, when an RCS value of the target is low, or when the target is located far away from a radar sensor, a strength of a signal reflected from the target is greatly attenuated. As shown in FIG. 13, a target point is not detected from a region 1321 of the CFAR result 1320 corresponding to the preceding object 1311.

The radar data processing apparatus calculates the noise representative information 1330 for each target point as described above with reference to FIG. 11. The noise representative information 1330 of FIG. 13 represents RSS values for each target point. A relatively dark portion of the noise representative information 1330 represents a relatively low RSS value, and a relatively bright portion of the noise representative information 1330 represents a relatively high RSS value. Thus, in the noise representative information 1330, the relatively dark portion indicates a relatively high probability that a radar signal is a normal signal, and the relatively bright portion indicates a relatively high probability that a radar signal is a noise signal.

The noise representative information 1330 is used to capture a target corresponding to a reflected signal representing a linear phase change despite a low signal strength. As shown in FIG. 13, a target point is detected from a region 1331 of the noise representative information 1330 corresponding to the preceding object 1311.

Thus, the radar data processing apparatus accurately detects an object and tracks an object with a weak signal by cooperatively using the radar data and the noise representative information 1330.

Figure 14:
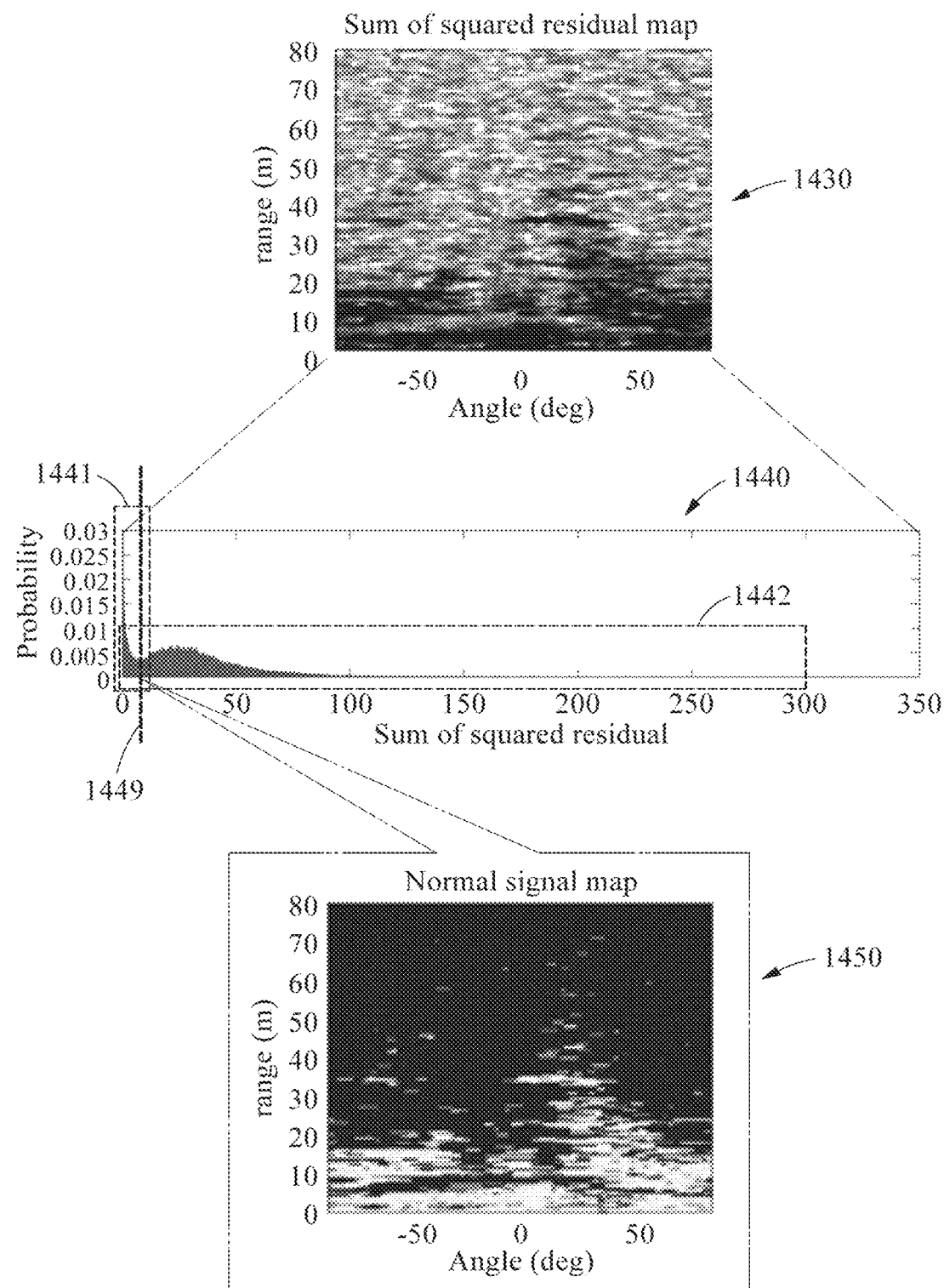
FIG. 14 illustrates an example of an operation of determining a normal signal from noise representative information.

FIG. 14 illustrates an example of an operation of determining a normal signal from noise representative information.

A radar data processing apparatus extracts a normal signal from noise representative information 1430. The normal signal is a signal with a low noise component among signals reflected from a plurality of target points. For example, the radar data processing apparatus determines a target point representing a normal signal in the noise representative information 1430 based on a comparison between the noise representative information 1430 and a threshold 1449. For example, in response to a noise representative value in the noise representative information 1430 being less than the threshold 1449, the radar data processing apparatus determines, as a normal signal, a signal sensed from a target point corresponding to the noise representative value.

The radar data processing apparatus determines, based on a distribution 1440 (for example, a histogram) of the noise representative information 1430, the threshold 1449 that is used as a criterion to determine whether a radar signal is a normal signal. The distribution 1440 of the noise representative information 1430 is represented by a number of target points counted based on an axis representing the noise representative value. For example, when a noise representative value included in the noise representative information 1430 is an RSS value of each target point, a horizontal axis and a vertical axis of the distribution 1440 represent an RSS value and a number of target points with RSS values, respectively. However, the vertical axis is not limited thereto, and represents, for example, a probability of having an arbitrary RSS value by dividing the number of target points with RSS values by a total number of target points. For example, a distribution probability of RSS values is modeled as shown in Equation 8 below.

$$p(x) = p(A)p(x|A) + p(B)p(x|B) \qquad (8)$$

In Equation 8, p(x) denotes a probability that an RSS value is x, p(A) denotes a probability that an arbitrary signal belongs to a class A, and p(B) denotes a probability that an arbitrary signal belongs to a class B. Also, x denotes an RSS value calculated for an arbitrary target point. p(x|A) denotes a probability that an RSS value of a signal in the class A is x, and p(x|B) denotes a probability that an RSS value of a signal in the class B is x.

Based on Equation 8, the radar data processing apparatus classifies the distribution 1440 of the noise representative information 1430 into a first distribution 1441 and a second distribution 1442. For example, a radar signal sensed from each target point is assumed to belong to one of two classes. For example, the class A is a class that has a small amount of noise due to a dominant signal component, and the class B is a class that has a large amount of noise due to a dominant noise component. Each of the two classes forms a distribution. In FIG. 14, the first distribution 1441 is a distribution of signals included in the class A, and the second distribution 1442 is a distribution of signals included in the class B. The first distribution 1441 has a first peak, and the second distribution 1442 has a second peak. The first peak appears at a point corresponding to an RSS value close to zero. The second peak appears at a point corresponding to an RSS value greater than the RSS value corresponding to the first peak. A distribution with two peaks as described above is referred to as a "bimodal distribution." In FIG. 14, the bimodal distribution is modeled as a bimodal gamma distribution. Also, when a sufficiently large number of chirps (for example, a number of chirps greater than or equal to a threshold number) is used during one scan, the distribution 1440 of the noise representative information 1430 is also modeled as a bimodal Gaussian distribution.

The radar data processing apparatus determines, as the threshold 1449, a value between a noise representative value corresponding to the first peak and a noise representative value corresponding to the second peak in the distribution 1440 of the noise representative information 1430. For example, the radar data processing apparatus determines, as the threshold 1449, an RSS value corresponding to a point at which the first distribution and second distribution intersect. In an example, when a noise representative value of a radar signal sensed from an arbitrary target point is less than the threshold 1449, the radar data processing apparatus determines that a normal signal (for example, a signal belonging to the above-described class A) is received from the target point. In another example, when a noise representative value of a radar signal sensed from an arbitrary target point is greater than or equal to the threshold 1449, the radar data processing apparatus determines that a noise signal (for example, a signal belonging to the above-described class B) is received from the target point.

The radar data processing apparatus classifies radar signals sensed from a plurality of target points based on the threshold 1449, and generates a normal signal map 1450 as shown in FIG. 14. The normal signal map 1450 is a map including target points with a normal signal from the noise representative information 1430.

For example, the radar data processing apparatus may determine a new threshold every radar scan, or fix the threshold 1449 that is set at an initial stage (for example, a manufacturing of the radar data processing apparatus). In this example, the radar data processing apparatus determines whether a radar signal is a normal signal by comparing the fixed threshold 1449 to noise representative values calculated from radar signals sensed during driving. When the threshold 1449 is fixed, the radar data processing apparatus skips a calculation of the distribution 1440 of the noise representative information 1430.

Although the normal signal map 1450 is extracted through threshold processing as described above in FIG. 14, examples are not limited thereto. The radar data processing apparatus determines a class to which a radar signal is to belong, using a maximum a posteriori (MAP) scheme or a maximum likelihood estimation (MLE) scheme. Also, the radar data processing apparatus calculates a posterior probability or a likelihood that a signal belongs to the class A or B, instead of the above-described binarization technique. For example, the radar data processing apparatus directly calculates a probability that a radar signal belongs to each class from a noise representative value.

In an example, the radar data processing apparatus detects a nearby object based on the noise representative information 1430 and a result (for example, a CFAR result) obtained by processing radar data. In another example, the radar data processing apparatus determines driving-related information based on radar data and noise representative information 1430 corresponding to a determined target point. Examples of determining driving-related information will be further described below with reference to FIGS. 15 and 16.

Figure 15:
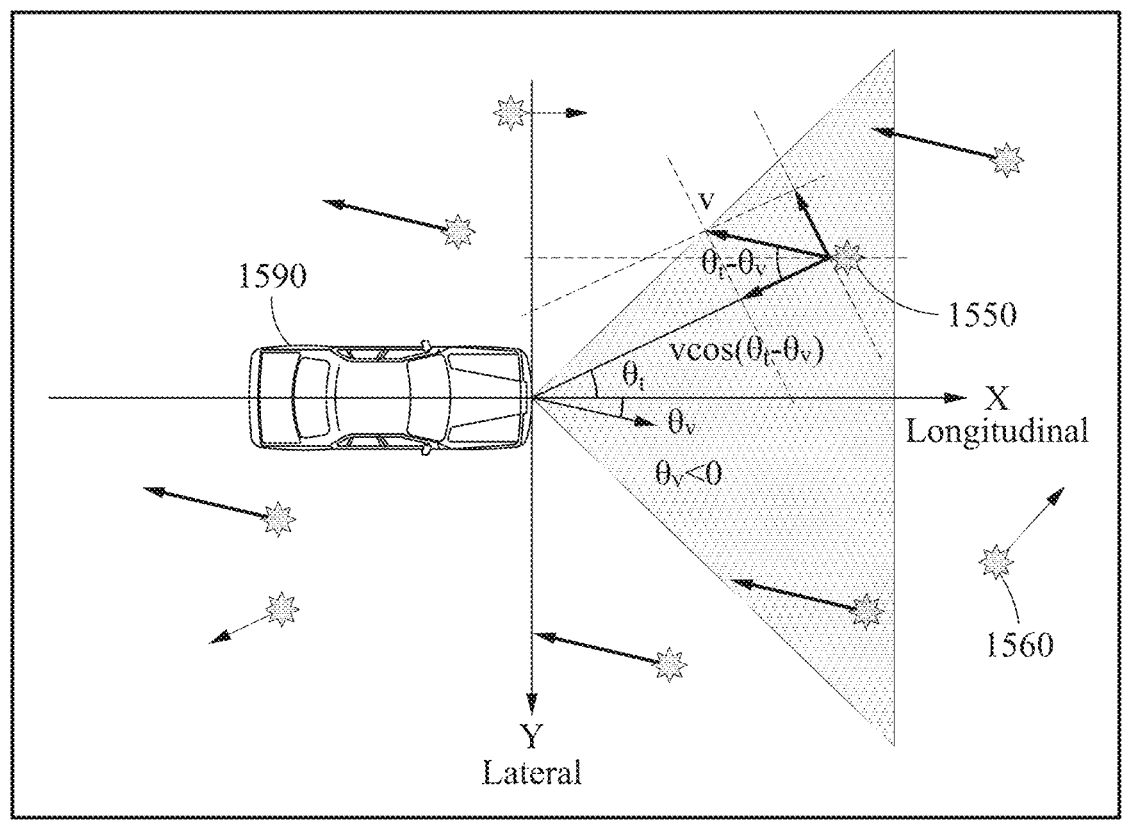
FIG. 15 illustrates an example of an operation of determining a vehicle velocity based on a determined normal signal.

FIG. 15 illustrates an example of an operation of determining a vehicle velocity based on a determined normal signal.

A radar data processing apparatus 1590 estimates a candidate velocity from radar data corresponding to each of a plurality of target points, for example, target points 1550 and 1560, that represent normal signals. The candidate velocity is a relative velocity of each of the target points with respect to the radar data processing apparatus 1590. For example, when the target point 1550 corresponds to a static target, a candidate velocity corresponds to a vehicle's own velocity. The radar data processing apparatus 1590 estimates a candidate velocity based on a Doppler velocity and angle calculated from a normal signal reflected and received from each of the target points 1550 and 1560.

FIG. 15 is a top view of a vehicle, and an x axis and a y axis respectively correspond to a longitudinal axis and a lateral axis of the vehicle. The original point corresponds to a radar sensor included in the vehicle. $\theta_v$ represents a steering angle of the vehicle with respect to the longitudinal axis, and $\theta_t$ represents an angle from the radar sensor to the target point 1550 with respect to the longitudinal axis. Also, v represents a current velocity of the vehicle. The radar data processing apparatus 1590 calculates $v_d = v \cdot \cos(\theta_t - \theta_v)$ as a Doppler velocity based on a radar signal sensed from the target point 1550 in the example of FIG. 15. Thus, the radar data processing apparatus 1590 calculates $$v = \frac{v_d}{\cos(\theta_t - \theta_v)}$$

as a candidate velocity.

Also, the radar data processing apparatus 1590 determines a vehicle velocity based on candidate velocities estimated from the plurality of target points. The radar data processing apparatus 1590 determines, as a vehicle velocity, a representative value representing a plurality of candidate velocities. A portion, for example, the target point 1560, of the target points corresponds to a moving target, instead of a static target, and the radar data processing apparatus 1590 excludes a candidate velocity corresponding to the target point 1560 that corresponds to a movement state. For example, the radar data processing apparatus 1590 determines, as a representative velocity, a velocity supported by multiple candidate velocities among the plurality of candidate velocities. The radar data processing apparatus 1590 classifies the plurality of candidate velocities into groups with similar velocity values. The radar data processing apparatus 1590 determines, as a representative velocity, a velocity value (for example, an average value of candidate velocities belonging to a group) corresponding to a group including a number of target points greater than a threshold count (for example, half of the total number of target points) among the plurality of target points. The radar sensor in the vehicle scans a wide region, because targets within a FOV of the radar sensor are mostly stationary objects, for example, street lamps, street trees, curbs, tiles, or manholes.

Thus, the radar data processing apparatus 1590 accurately estimates the vehicle velocity as driving-related information based on noise representative information sensed from various targets, despite a weak signal strength. For example, the radar data processing apparatus 1590 determines driving-related information robustly against noise in terms of signals. Also, even in a situation of a large number of individually randomly moving objects, the radar data processing apparatus 1590 robustly and accurately estimates the vehicle velocity based on a number of targets (for example, targets represented by noise representative information) greater than the number of individually randomly moving objects.

When the vehicle's own velocity is estimated, the radar data processing apparatus 1590 determines whether each of all targets within a range sensible by the radar sensor is substantially stationary or moving. For example, the radar data processing apparatus 1590 compares the vehicle velocity and a Doppler velocity that is estimated for a target point. In this example, when a difference between the vehicle velocity and the Doppler velocity exceeds a threshold velocity difference, the radar data processing apparatus 1590 determines the target point to be a point on a moving object.

Figure 16:
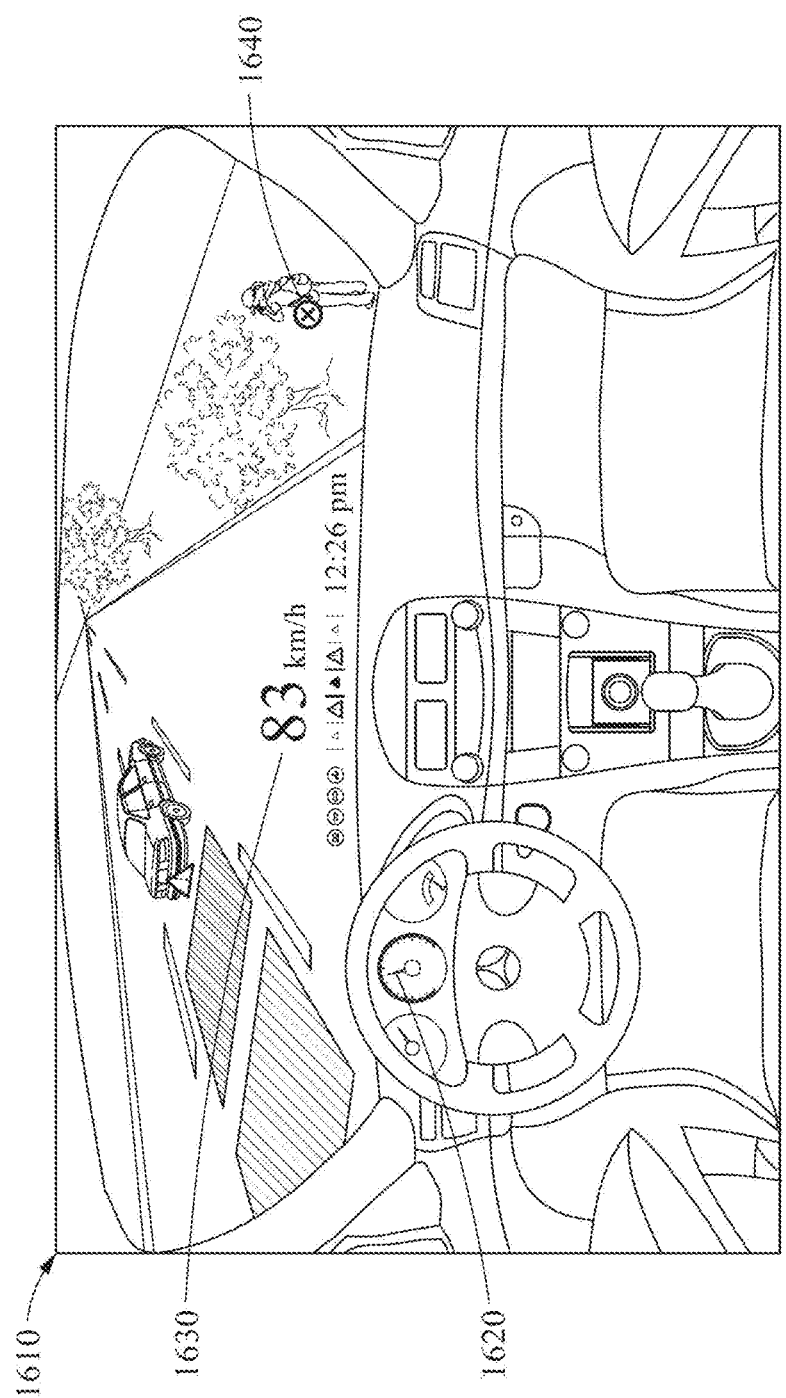
FIG. 16 illustrates an example of an operation of providing determined driving-related information to a user.

FIG. 16 illustrates an example of an operation of providing determined driving-related information to a user.

A radar data processing apparatus provides driving-related information to a user. For example, the radar data processing apparatus visualizes a vehicle velocity calculated from the driving-related information. Referring to FIG. 16, the radar data processing apparatus visualizes the vehicle velocity by controlling a needle using a vehicle dashboard 1620. In an example, when the vehicle dashboard 1620 is implemented as a display, the radar data processing apparatus visualizes the vehicle velocity by adjusting velocity content (for example, velocity information) displayed on the display. In another example, the radar data processing apparatus visualizes the vehicle velocity using a display, for example, a head-up display (HUD). In FIG. 16, an HUD forms an image plane, in which a virtual image is formed, using a windshield glass, and the radar data processing apparatus visualizes velocity content 1630 based on an image plane within a user's view 1610. In this example, the HUD provides a left image and a right image to a left eye and a right eye of a user, respectively, to provide the user with three-dimensionally visualized content.

Also, the radar data processing apparatus indicates, as driving-related information, object detection information that is detected based on noise representative information and a result obtained by processing radar data. The indicating of the object detection information includes an explicit indication operation and an implicit indication operation. The explicit indication operation includes an operation of directly providing the object detection information to the outside of the radar data processing apparatus. The implicit indication operation includes an operation of using the object detection information in the radar data processing apparatus.

For example, as the explicit indication operation, the radar data processing apparatus visualizes detection information about a target (for example, a human) detected based on the noise representative information and radar data as shown in FIG. 16. The radar data processing apparatus visualizes detection information so that the detection information is overlaid on an actual target using a display, for example, a vehicle HUD. Although the detection information is visualized in a form of warning content 1640 as shown in FIG. 16, examples are not limited thereto.

As the implicit indication operation, the radar data processing apparatus controls a movement of a vehicle based on the object detection information. For example, the radar data processing apparatus determines, based on the object detection information, a direction of the vehicle, or a distance from the vehicle to an object. The radar data processing apparatus changes a velocity of the vehicle, or controls steering of the vehicle, based on the distance to the object.

Thus, the radar data processing apparatus may provide a more precise advanced driver-assistance systems (ADAS) technology by combining information of different types of sensors, for example, a camera, an ultrasonic sensor or a light detection and ranging (lidar), a global positioning system (GPS) or a vehicle-to-everything (V2X) communication, as well as radar data.

The radar data processing apparatuses 110, 200, 300 and 1590, the radar sensors 111 and 210, 310 and 410, other apparatuses, units, modules, devices, and other components described herein with respect to FIGS. 1, 2, 3, 4 and 15 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The method illustrated in FIG. 8 that performs the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented method of processing radar data, the method comprising:
   determining, by one or more processors, phase information of a radar signal received by a radar sensor, to track a phase change tendency;
   determining, by the one or more processors, noise representative information based on the phase change tendency identified from the calculated phase information;
   determining, by the one or more processors, driving-related information based on the noise representative information and radar data calculated from the radar signal, the driving-related information including at least one of an object tracking result and an object identification result; and
   controlling, by the one or more processors, a movement of a vehicle based on a result of the determining of the driving-related information.

2. The method of claim 1, wherein the determining the phase information comprises:
   sensing a series of chirp signals through a scan of the radar sensor for each target point of a plurality of target points, the scan including radiating signals from the radar sensor and receiving, by the radar sensor, reflected signals; and
   determining a phase change tendency corresponding to the sensed series of chirp signals.

3. The method of claim 2, wherein the determining the phase change tendency comprises determining Doppler axis-based phase values from each chirp signal of the sensed series of chirp signals.

4. The method of claim 2, wherein the determining the phase change tendency comprises identifying the plurality of target points based on distance information and angle information analyzed from the radar signal.

5. The method of claim 1, wherein the determining the phase information comprises applying an unwrapping operation to the phase information.

6. The method of claim 1, wherein the determining the noise representative information comprises:
   estimating a linear model based on a linear regression analysis of the phase information; and
   estimating a goodness of fit of the phase information with respect to the linear model as the noise representative information.

7. The method of claim 6, wherein the determining the noise representative information comprises:
calculating an error between a phase value and a value estimated based on the linear model for each chirp signal of a series of chirp signals; and
determining a sum associated with the calculated error as the noise representative information.

8. The method of claim 1, wherein the determining the driving-related information comprises detecting a neighboring object around the vehicle based on the noise representative information and a result obtained by processing the radar data.

9. The method of claim 1, wherein the determining the driving-related information comprises:
determining a target point indicating a normal signal in the noise representative information based on a comparison between the noise representative information and a threshold; and
determining the driving-related information based on radar data and noise representative information corresponding to the determined target point.

10. The method of claim 9, further comprising:
determining the threshold based on a distribution of the noise representative information.

11. The method of claim 10, wherein the determining the threshold comprises determining, as the threshold, a value between a value corresponding to a first peak and a value corresponding to a second peak in the distribution.

12. The method of claim 9, wherein the determining the driving-related information comprises:
estimating a candidate velocity from radar data corresponding to each of a plurality of target points indicating the normal signal; and
determining a vehicle velocity of the vehicle based on candidate velocities estimated from the plurality of target points.

13. The method of claim 12, wherein the determining the vehicle velocity comprises estimating the candidate velocity based on an angle and a Doppler velocity calculated from the normal signal reflected from each of the plurality of target points and received.

14. The method of claim 12, wherein the determining the vehicle velocity comprises determining, as the vehicle velocity, a representative value representing a plurality of candidate velocities.

15. The method of claim 1, further comprising:
providing the driving-related information to a user.

16. The method of claim 15, wherein the providing the driving-related information to the user comprises visualizing a vehicle velocity calculated from the driving-related information.

17. The method of claim 1, further comprising:
indicating, as the driving-related information, object detection information detected based on the radar data and the noise representative information.

18. The method of claim 17, wherein the indicating the object detection information comprises controlling a movement of a vehicle based on the object detection information.

19. A non-transitory computer-readable storage medium storing instructions that, when executed by a processor, cause the processor to perform the method of claim 1.

20. An apparatus for processing radar data, the apparatus comprising:
a radar sensor configured to sense a radar signal; and
a processor configured to:
determine phase information of the radar signal;
determine noise representative information based on the phase change tendency identified from the calculated phase information;
determine driving-related information based on the noise representative information and radar data calculated from the radar signal, the driving-related information including at least one of an object tracking result and an object identification result; and
control a movement of a vehicle based on a result of the determining of the driving-related information.

21. An apparatus, comprising:
a radar sensor configured to sense radar signals related to a plurality of target points; and
a processor configured to:
determine phase information of radar signals sensed by a radar sensor, to track a phase change tendency;
determine noise representative information associated with the radar signals based on the phase change tendency identified from the calculated phase information;
determine, as a threshold, a value between a noise representative value corresponding to a first peak and a noise representative value corresponding to a second peak in a distribution of the noise representative information;
classify the radar signals sensed from the plurality of target points based on the threshold and generate a signal map including target points with a normal signal from the noise representative information; and
control a movement of a vehicle based on a result of the classifying and the generating.

22. The apparatus of claim 21, wherein the processor is configured to determine that a normal signal is received from a specific target point in a case in which a noise representative value of a radar signal sensed from the specific target point is less than the threshold.

23. The apparatus of claim 21, wherein the processor is configured to determine that a noise signal is received from a specific target point when a noise representative value of a radar signal sensed from the specific target point is greater than or equal to the threshold.

* * * * *